(12) United States Patent
    Mixter

(10) Patent No.:     US 12,688,425 B2
(45) Date of Patent:         Jul. 21, 2026

(54) PREDICTION OF CLASSIFICATION OF AN UNKNOWN INPUT BY A TRAINED NEURAL NETWORK

(71) Applicant: Raytheon Company, Waltham, MA (US)

(72) Inventor: John E. Mixter, Tuscon, AZ (US)

(73) Assignee: Raytheon Company, Arlington, VA (US)

( * ) Notice: Subject to any disclaimer, the term of this patent is extended or adjusted under 35 U.S.C. 154(b) by 958 days.

(21) Appl. No.: 17/409,222

(22) Filed: Aug. 23, 2021

(65)               Prior Publication Data

US 2023/0054467 A1     Feb. 23, 2023

(51) Int. Cl.
    *G06N 3/084*              (2023.01)
(52) U.S. Cl.
    CPC ................................... *G06N 3/084* (2013.01)
(58) Field of Classification Search
    CPC ........... G06N 5/022; G06N 5/01; G06N 5/04; G06N 20/20
    See application file for complete search history.

(56)               References Cited

U.S. PATENT DOCUMENTS

| | | |
|---|---|---|
| 5,701,398 A | 12/1997 | Glier et al. |
| 5,920,477 A | 7/1999 | Hoffberg et al. |
| 7,039,239 B2 | 5/2006 | Loui et al. |
| 7,308,134 B2 | 12/2007 | Wersing et al. |
| 7,425,201 B2 | 9/2008 | Euliano et al. |
| 7,588,543 B2 | 9/2009 | Euliano et al. |

| | | |
|---|---|---|
| 7,593,904 B1 | 9/2009 | Kirshenbaum et al. |
| 7,849,030 B2 | 12/2010 | Ellingsworth |
| 8,645,137 B2 | 2/2014 | Bellegarda et al. |

(Continued)

FOREIGN PATENT DOCUMENTS

| | | |
|---|---|---|
| AT | 507800 A4 | 8/2010 |
| AU | 2003268324 A1 | 3/2004 |

(Continued)

OTHER PUBLICATIONS

Goswami, "Introduction to Early Stopping: an effective tool to regularize neural nets", published Aug. 9, 2020, accessed on https://towardsdatascience.com/early-stopping-a-cool-strategy-to-regularize-neural-networks-bfdeca6d722e (Year: 2020).*

(Continued)

*Primary Examiner* — Kakali Chaki
*Assistant Examiner* — Josep Han
(74) *Attorney, Agent, or Firm* — Schwegman Lundberg & Woessner, P.A.

(57)               ABSTRACT

A system and method are provided for classifying of an unknown object by a trained neural network. The method includes receiving unknown input data that is not classified. For each class of a set of candidate classes for which the neural network has been trained, the method further includes retraining the neural network from its trained state until a prediction can be made for classifying the input data to the class by an inference procedure and determining an amount of effort exerted for retraining the class. The method further includes selecting a class of the group of classes for which the least amount of effort was exerted and outputting the selected class as the predicted class to which the input data is predicted to be classified.

14 Claims, 3 Drawing Sheets

(56) References Cited

U.S. PATENT DOCUMENTS

| | | | |
|---|---|---|---|
| 8,672,858 | B2 | 3/2014 | Euliano et al. |
| 8,738,552 | B2 | 5/2014 | Ellingsworth |
| 8,904,520 | B1 | 12/2014 | Nachenberg et al. |
| 8,935,167 | B2 | 1/2015 | Bellegarda |
| 9,620,105 | B2 | 4/2017 | Mason |
| 9,646,614 | B2 | 5/2017 | Bellegarda et al. |
| 9,685,174 | B2 | 6/2017 | Karam et al. |
| 9,697,820 | B2 | 7/2017 | Jeon |
| 9,697,822 | B1 | 7/2017 | Naik et al. |
| 9,818,400 | B2 | 11/2017 | Paulik et al. |
| 9,922,642 | B2 | 3/2018 | Pitschel et al. |
| 9,959,870 | B2 | 5/2018 | Hunt et al. |
| 10,034,645 | B1 | 7/2018 | Williams |
| 10,049,668 | B2 | 8/2018 | Huang et al. |
| 10,074,360 | B2 | 9/2018 | Kim |
| 10,241,644 | B2 | 3/2019 | Gruber et al. |
| 10,255,907 | B2 | 4/2019 | Nallasamy et al. |
| 10,275,688 | B2 | 4/2019 | Jiang |
| 10,285,658 | B2 | 5/2019 | Williams |
| 10,296,160 | B2 | 5/2019 | Shah et al. |
| 10,311,312 | B2 | 6/2019 | Yu et al. |
| 10,361,802 | B1 | 7/2019 | Hoffberg-Borghesani et al. |
| 10,366,158 | B2 | 7/2019 | Bellegarda et al. |
| 10,410,055 | B2 | 9/2019 | Wang et al. |
| 10,503,971 | B1 | 12/2019 | Dang et al. |
| 10,521,466 | B2 | 12/2019 | Bellegarda et al. |
| 10,535,017 | B2 | 1/2020 | Johnson et al. |
| 10,553,209 | B2 | 2/2020 | Gruber et al. |
| 10,572,800 | B2 | 2/2020 | Wang et al. |
| RE47,908 | E | 3/2020 | Hoffberg et al. |
| 10,593,346 | B2 | 3/2020 | Van Gysel et al. |
| 10,606,982 | B2 | 3/2020 | Guo et al. |
| 10,621,474 | B2 | 4/2020 | Sharma et al. |
| RE48,056 | E | 6/2020 | Hoffberg et al. |
| 10,671,873 | B2 | 6/2020 | Wang et al. |
| 10,702,232 | B2 | 7/2020 | Williams |
| 10,706,373 | B2 | 7/2020 | Gruber et al. |
| 10,710,119 | B2 | 7/2020 | Kumar et al. |
| 10,748,529 | B1 | 8/2020 | Milden |
| 10,762,673 | B2 | 9/2020 | Luo et al. |
| 10,783,381 | B2 | 9/2020 | Yu et al. |
| 2003/0002731 | A1 | 1/2003 | Wersing et al. |
| 2004/0040560 | A1 | 3/2004 | Euliano et al. |
| 2007/0232951 | A1 | 10/2007 | Euliano et al. |
| 2012/0215081 | A1 | 8/2012 | Euliano et al. |
| 2017/0193097 | A1 | 7/2017 | Cramer et al. |
| 2017/0228645 | A1 | 8/2017 | Wang et al. |
| 2018/0357542 | A1 | 12/2018 | Wu et al. |
| 2020/0000373 | A1 | 1/2020 | Agrawal et al. |
| 2020/0098284 | A1 | 3/2020 | Yang et al. |
| 2020/0226401 | A1 | 7/2020 | Rajagopal et al. |
| 2021/0150364 | A1 | 5/2021 | Mixter |
| 2021/0216912 | A1* | 7/2021 | Haase-Schuetz .... G06V 10/776 |

FOREIGN PATENT DOCUMENTS

| | | | |
|---|---|---|---|
| AU | 2019100969 | A4 | 10/2019 |
| CA | 2492528 | A1 | 3/2004 |
| CA | 2861505 | A1 | 8/2013 |
| CN | 104135925 | A | 11/2014 |
| CN | 106780439 | A | 5/2017 |
| CN | 109040957 | A | 12/2018 |
| CN | 109117511 | A | 1/2019 |
| CN | 109934804 | A | 6/2019 |
| CN | 109978057 | A | 7/2019 |
| CN | 110047082 | A | 7/2019 |
| CN | 110073301 | A | 7/2019 |
| CN | 110174401 | A | 8/2019 |
| CN | 110675933 | A | 1/2020 |
| CN | 110942100 | A | 3/2020 |
| CN | 111035840 | A | 4/2020 |
| CN | 111241837 | A | 6/2020 |
| CN | 112149754 | A | 12/2020 |
| CN | 112149754 | | 6/2021 |
| DE | 112017000670 | T5 | 10/2018 |
| EP | 1262907 | A1 | 12/2002 |
| EP | 1534131 | A2 | 6/2005 |
| EP | 2816952 | A1 | 12/2014 |
| EP | 3220354 | A1 | 9/2017 |
| EP | 3398048 | A1 | 11/2018 |
| JP | 2005537068 | A | 12/2005 |
| JP | 4836453 | B2 | 12/2011 |
| JP | 2019508787 | A | 3/2019 |
| JP | 2019509550 | A | 4/2019 |
| KR | 20180120146 | A | 11/2018 |
| KR | 20190059225 | A | 5/2019 |
| KR | 20200026110 | A | 3/2020 |
| WO | WO-2004019766 | A2 | 3/2004 |
| WO | WO-2013126417 | A1 | 8/2013 |
| WO | WO-2017117234 | A1 | 7/2017 |
| WO | WO-2017136802 | A1 | 8/2017 |
| WO | WO-2019111550 | A1 | 6/2019 |
| WO | WO-2020188004 | A | 9/2020 |

OTHER PUBLICATIONS

Ng, A, "CS294A Course Notes—Sparse Autoencoder," downloaded from <https://web.stanford.edu/class/cs294a/sparseAutoencoder_2011new.pdf> and verified online at least as of Feb. 19, 2015 via <https://web.archive.org/web/20150219073254/https://web.stanford.edu/class/cs>, 19 pp. (Year: 2011).*

International Search Report and Written Opinion for PCT Patent Application No. PCT/US2022/075347, dated Dec. 16, 2022.

"International Application Serial No. PCT US2022 075347, International Search Report mailed Dec. 16, 2022", 4 pgs.

"International Application Serial No. PCT US2022 075347, Written Opinion mailed Dec. 16, 2022", 7 pgs.

"International Application Serial No. PCTUS2022075347, International Preliminary Report on Patentability mailed Mar. 7, 2024", 9 pgs.

"European Application Serial No. 22773086.8, Communication Pursuant to Article 943 EPC mailed Oct. 1, 2025", 9 pgs.

"European Application Serial No. 22773086.8, Response filed Jan. 9, 2026 to Communication Pursuant to Article 943 EPC mailed Oct. 1, 2025", 12 pgs.

* cited by examiner

PREDICTION OF CLASSIFICATION OF AN UNKNOWN INPUT BY A TRAINED NEURAL NETWORK

BACKGROUND

1. Field of the Disclosure

The present disclosure relates to machine learning, and more particularly, to prediction of classification of an unknown input by a trained neural network.

2. Description of Related Art

A neural network uses artificial intelligence for deep training. A neural network can have one or more layers that are trained. Neurons in each layer are assigned weights that correspond to respective candidate classes. During an iterative back propagation process, the weights are adjusted.

Once trained, an unknown input can be presented to an input layer of the neural network and then forward propagated for performance of an inference process. During the inference process, a prediction is made which of the candidate classes is the most probable class to which the input belongs. If the prediction meets a prediction threshold, a response with the prediction is returned as a response. If the prediction does not meet the prediction threshold, it is considered an incorrect prediction.

While conventional methods and systems have generally been considered satisfactory for their intended purpose, there is still a need in the art for prediction of classification of an unknown input by a trained neural network when a prediction threshold is not met.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a method of classifying an unknown object by a trained neural network. The method includes receiving unknown input data that is not classified. For each class of a set of candidate classes for which the neural network has been trained, the method further includes retraining the neural network from its trained state until a prediction can be made for classifying the input data to the class by an inference procedure and determining an amount of effort exerted for retraining the class. The method further includes selecting a class of the group of classes for which the least amount of effort was exerted and outputting the selected class as the predicted class to which the input data is predicted to be classified.

In one or more embodiments, retraining the neural network can include accessing a copy of the trained neural network as trained; and iteratively performing backpropagation in the trained neural network as copied using the class using the class as the target class until the prediction can be made for classifying the input data to the class.

In one or more embodiments, determining the amount of effort exerted for retraining the class can include counting the number of iterations performed.

In one or more embodiments, reselecting the class of the group of classes for which the least amount of effort was exerted can include selecting the class for which the least number of iterations were performed.

In one or more embodiments, retraining the trained neural network can further include determining when the prediction can be made for classifying the input data to the class, the inference procedure can be a forward propagation procedure that outputs a predicted class, and it can be determined that the prediction can be made for classifying the input data to the class when the inference procedure outputs the class as the predicted class.

In one or more embodiments, the inference procedure can further output a prediction strength associated with the predicted class that indicates a level of confidence in the predicted class, and wherein determining when the prediction can be made for classifying the input data to the class can include determining whether the output prediction strength satisfies a threshold criteria.

In one or more embodiments, the predicted class can be associated with a neuron of the trained neural network after retraining for which a highest value was output by the forward propagation and the prediction strength is a difference between the highest value and a second highest value output for another neuron of the trained neural network after retraining by the forward propagation, and the threshold criteria can be satisfied when the different exceeds a predetermined threshold.

In one or more embodiments, the copy of the trained neural network can include a copy of weights associated with the trained neural network once trained and before weights are changed by backpropagation during retraining.

In accordance with further aspects of the disclosure, one or more computer systems are provided that include a memory configured to store instructions and a processor disposed in communication with the memory, wherein the processor upon execution of the instructions is configured to perform each of the respective disclosed methods. In accordance with still further aspects of the disclosure non-transitory one or more computer readable storage mediums and one or more computer programs embedded therein are provided, which when executed by a computer system, cause the computer system(s) to perform the respective disclosed methods.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
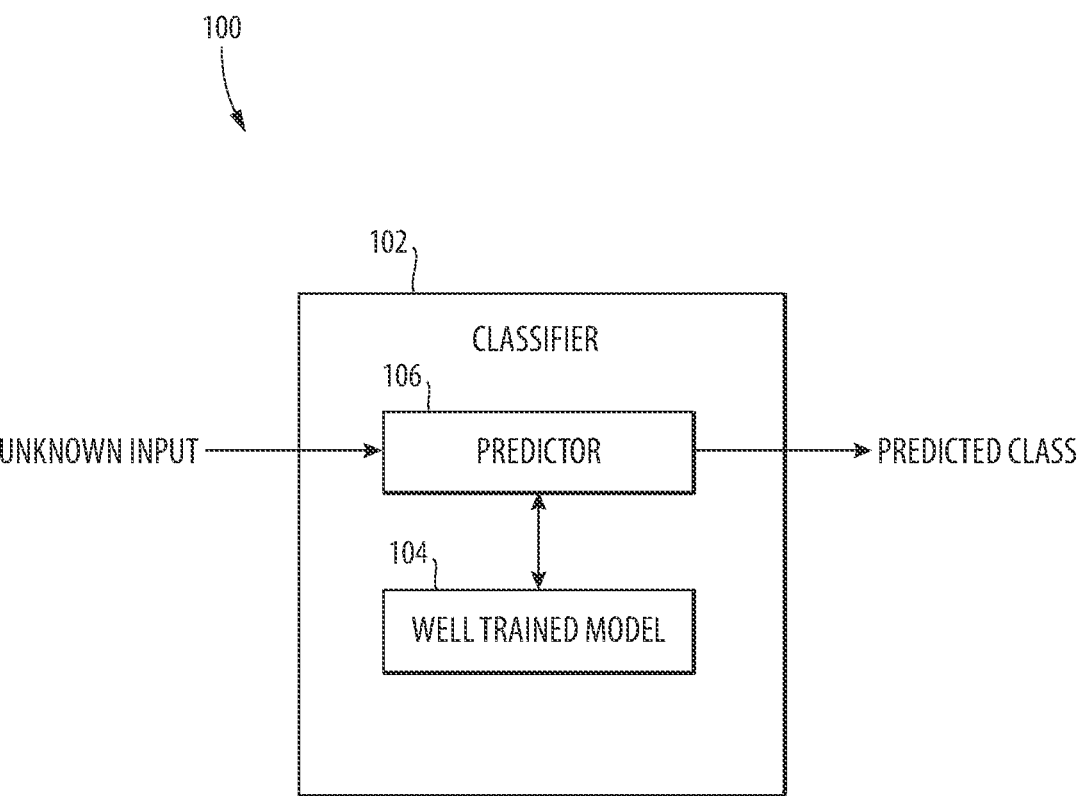
FIG. 1 is a block diagram illustrating of an exemplary classification prediction system in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a classification system in accordance with the disclosure is shown in FIG. 1 and is designated generally by reference character 100. Methods associated with classification operations of the classification system 100 in accordance with the disclosure, or aspects thereof, are provided in FIGS. 2 and 3, as will be described. The systems and methods described herein can be used to provide classification of an unknown input.

Classification system 100 is configured to classify unknown inputs. Classification system 100 includes a classifier 102 having a well-trained model 104 and a predictor 106. Well-trained model 104 uses a neural network and applies a perceptron algorithm to train the well-trained model 104 for assigning a weight to each class of a set of candidate classes.

The training process uses back propagation to adjust each weight in an untrained model's neural network in proportion to how much the weight contributes to overall error. Each weight's error is iteratively reduced until a point is reached at which the assigned weights are determined to be usable for making predictions, at which point the model is considered to be well-trained. The larger the number of iterations for a class, also referred to as a backpropagation count, the more effort exerted for reducing weight error for that class.

Once trained, well-trained model 104 can receive an input, use forward propagation to predict a class of the candidate classes to which the input is to be assigned. The forward propagation process outputs a prediction result for each class. The value of the prediction result indicates the strength of a prediction for the corresponding class. When a high prediction result is high for only one class of the candidate classes, the prediction has high confidence. When the highest prediction result is similar for multiple classes, the confidence is lowered.

When predictor module 102 receives a query that includes an unknown input, predictor module 102 accesses well-trained model 104 and attempts to find a class to which the unknown input is most similar. The class that is found, if one is found, is then output as the predicted class in response to the query.

Finding the most similar class includes training the neural network of the model using back propagation, as if the unknown input belonged to the respective candidate classes. Before training the neural network for each class, a copy of the neural network is accessed in its original well-trained state. The copy of the neural network is a copy of weights associated with the neural network once it is well-trained and before the weights are changed by backpropagation of any of the classes. The amount of effort, measured by the number of backpropagation cycles, needed to train the neural network for each class is compared. The class for which the least amount of effort is used for the training is selected as the predicted class.

Before training the neural network using the unknown input using back propagation, certain classes of the candidate classes can be selected for performance of the training.

Selection from the candidate classes includes performing classification of the unknown object for each candidate classes using forward propagation and outputting a result of the classification performed for each of the candidate classes as a prediction result. The prediction result associated with each of the classes is compared to a threshold criteria. A class is selected from the candidate classes only if its associated prediction result satisfies the threshold criteria. The threshold criteria can be based on a level of confidence in the prediction.

Figure 2:
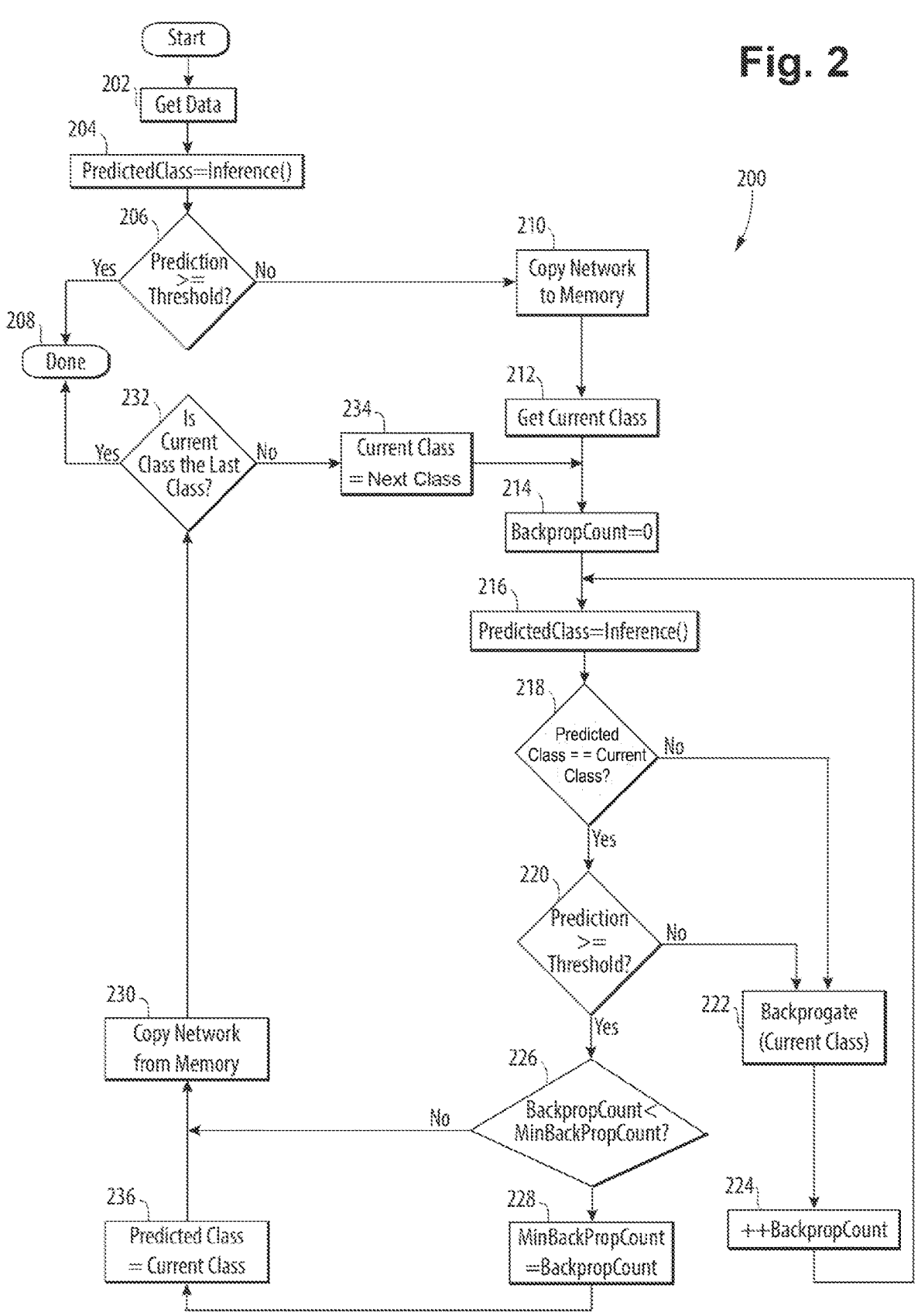
FIG. 2 is a flowchart of an example method of predicting classification of an unknown object by a well-trained neural network, in accordance with embodiments of the disclosure.

FIG. 2 shows an exemplary and non-limiting flowchart 200 illustrating an example method of predicting classification of an unknown object by a well-trained neural network, in accordance with certain illustrated embodiments. The method can be performed by a computing device, such as classifier 102 shown in FIG. 1. Before turning to the description of FIG. 2, it is noted that the flowchart 200 in FIG. 2 shows examples in which operational blocks are carried out in a particular order, as indicated by the lines connecting the blocks, but the various blocks shown in this flowchart can be performed in a different order, or in a different combination or sub-combination. It should be appreciated that in some embodiments some of the blocks described below may be combined into a single block. In some embodiments, one or more additional blocks may be included. In some embodiments, one or more of the blocks can be omitted.

At block 202 an input called Data is received by a well-trained neural network, such as a neural network of well-trained model 104. The well-trained model has a neural network that has been previously trained, including exposure to a group of classes. The well-trained model may or may not recognize the input data. When the well-trained model does not recognize the input data, meaning the input data is unknown, it may not be known to which of the classes in the group of classes the input data should be classified. The input data can be, for example, images, video, radar, or sensor data.

At block 204, an inference procedure is performed on Data, expressed as Inference(Data). The inference procedure can be performed in response to a request triggered by a user action or an automated process. Two results are output from block 204, namely a Predicted Class and a Prediction Strength. The Predicted Class is determined by the classification neuron of the neural network having a largest output value. The Prediction Strength is determined based on a difference between the two classification neurons with the largest output values.

At block 206, it is determined whether Prediction Strength is greater than a threshold variable, Threshold. If the determination at block 206 is that the Prediction Strength is greater than or equal to Threshold, the method ends at block 232 with the Predicted Class returned as the classification. If the determination at block 206 is that the Prediction Strength is less than Threshold, at block 208, the original state of the network, Network State, is copied and stored in memory before training of the neural network continues. Network State defines the weights as associated with the neural network once the neural network is well-trained and before the weights are adjusted by backpropagation of any of the classes.

At block 210, the current class is set to the first class in the group of classes. At block 212, a variable BackProp-Count that is used to count the number of time back propagation is called is initialized to zero. At block 214, the training loop is initiated by processing Data using the Inference( ) procedure, which returns a Predicted Class and Predicted Strength.

At block 216 the Predicted Class is compared to the Current Class, and a determination is made whether they are equal. If the determination at block 216 is that Predicted Class and Current Class are not equal, at block 224 a back propagation procedure is performed using Current Class as the target class, expressed as Back Propagation(Current Class). After execution of the back propagation procedure at block 224, BackPropCount is incremented at block 226 and the training loop is repeated, including blocks 214, 216, 218, 224, and 226, beginning at block 214.

Execution of the training loop continues until it is determined at decision block 216 that PredictedClass equals Current Class, and it is further determined at decision block 218 that Prediction Strength is greater than or equal to Threshold, after which decision block 220 is invoked. In other words, when the determination at decision block 218 is that Prediction Strength is greater than or equal to Threshold, the training loop is exited and the method continues at block 220. When the determination at decision block 218 is that Prediction Strength is less than Threshold, the training loop is resumed at block 224.

At decision block 220, a determination is made whether BackPropCount is less than a current smallest value (which can be initialized to a large value). When the determination at decision block 220 is that BackPropCount is less than the current smallest value, the method continues at blocks 228 and 230. When the determination at decision block 220 is that BackPropCount is not less than the current smallest value, the method continues at block 222.

At block 228, BackPropCount is saved as the current smallest value. At block 230, Predicted Class is set to be the Current Class. The method continues at block 222.

At block 222, the network is reset to the initial trained state. At decision block 234, a determination is made whether the Current Class is the last class in the group of classes. When the determination at decision block 222 is that the Current Class is the last class in the group of classes, the method ends at block 232. When the determination at decision block 234 is that the Current Class is not the last class in the group of classes, the method continues at block 236 and block 212. At block 236, the Current Class is set to the next class in the group of classes. At block 212, BackPropCount is reinitialized to zero again, after which the training loop is reentered, beginning at block 214.

In this way, each class of the group of classes is trained using the training loop. In the training loop, backpropagation is performed iteratively, with BackPropCount incremented for each iteration. The training loop is performed for each class, until output of the Inference( ) procedure invoked using the input data returns the class as the Predicted Class with the associated Predicted Strength greater than Threshold. The class of the group of classes for which the training loop was performed the lowest amount of times, as indicated by the value of BackPropCount, is selected as the predicted class for classification of the input data. The selected class performed back propagation the least amount of times, and thus used the least amount of effort to train the neural network to predict this class with sufficient confidence.

A computer embedded in an intelligent device can include a well-trained neural network and use the disclosed method for classification of unknown input. This allows the intelligent device to have the ability to adapt to unknown input data by guessing a classification of the input data using the disclosed method, thus enabling autonomous learning of the intelligent device after deployment.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
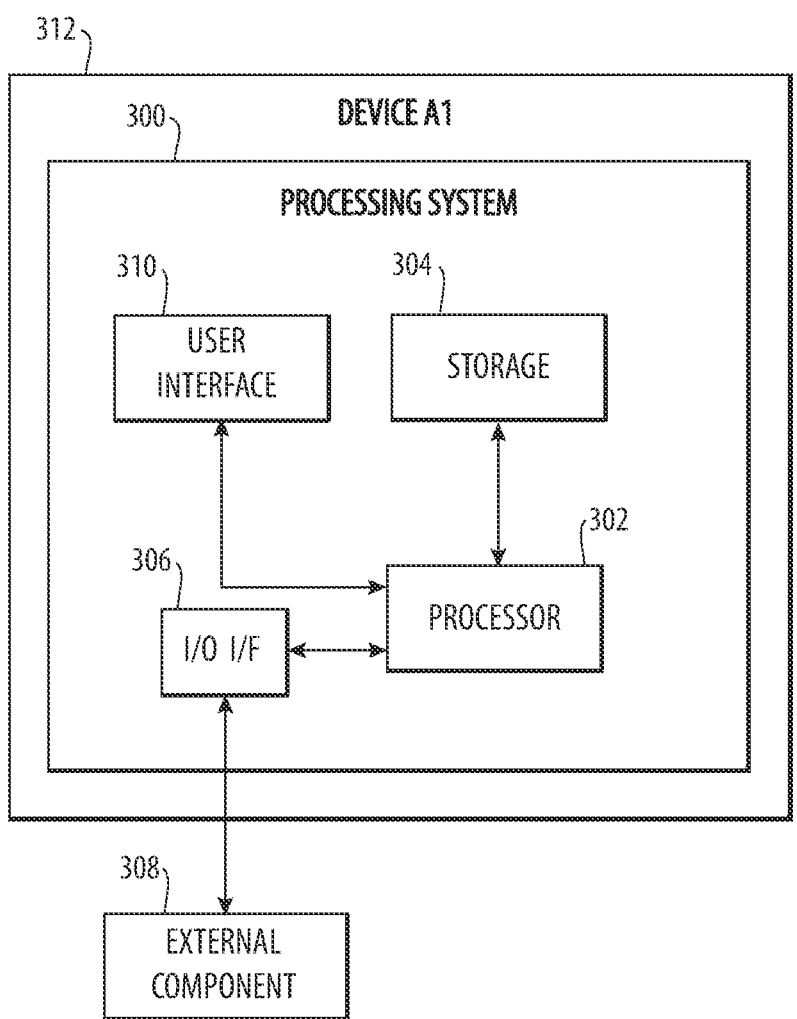
FIG. 3 is a block diagram of an exemplary processing system of a classifier of the classification prediction system of FIG. 1.

With reference to FIG. 3, a block diagram of an example processing system 300 is shown, which provides an example configuration of a processing system that could be included in classifier 102 of FIG. 1. In one or more embodiments, processing system 300 could be embedded in an intelligent device, such as device A1 referenced by reference numeral 312. In one or more embodiments, processing system 300 could be a free-standing processing system, such as a server, desktop computer, portable computer, or handheld computer. Processing system 300 is only one example of a suitable system and is not intended to suggest any limitation as to the scope of use or functionality of embodiments of the disclosure described herein. Processing system 300 can be implemented using hardware, software, and/or firmware. Regardless, processing system 300 is capable of being implemented and/or performing functionality as set forth in the disclosure.

Processing system 300 is shown in the form of a general-purpose computing device. Processing system 300 includes a processing device 302, memory 304, an input/output (I/O) interface (I/F) 306 that can communicate with an internal component, such as a user interface 310, and optionally an external component 308, such as a processing device that submits queries with input data to classifier 102 and receives returned responses to the queries.

The processing device 302 can include, for example, a programmable logic device (PLD), microprocessor, DSP, a microcontroller, an FPGA, an ASIC, and/or other discrete or integrated logic circuitry having similar processing capabilities.

The processing device 302 and the memory 304 can be included in components provided in the FPGA, ASIC, microcontroller, or microprocessor, for example. Memory 304 can include, for example, volatile and non-volatile memory for storing data temporarily or long term, and for storing programmable instructions executable by the processing device 302. Memory 304 can be a removable (e.g., portable) memory for storage of program instructions. I/O I/F 306 can include an interface and/or conductors to couple to the one or more internal components, such as user interface 310 and/or external components 308.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the processing components of classifier 102 may be implemented or executed by one or more computer systems, such as a microprocessor. Each computer system 300 can be included within classifier 102, or multiple instances thereof. In various embodiments, computer system 300 may include one or more of a microprocessor, an FPGA, application specific integrated circuit (ASIC), microcontroller. The computer system 300 can be provided as an embedded device. Portions of the computer system 300 can be provided externally, such by way of a virtual, centralized, and/or cloud-based computer.

Computer system 300 is only one example of a suitable system and is not intended to suggest any limitation as to the scope of use or functionality of embodiments of the disclosure described herein. Regardless, computer system 300 is capable of being implemented and/or performing any of the functionality set forth hereinabove.

Computer system 300 may be described in the general context of computer system-executable instructions, such as program modules, being executed by a computer system. Generally, program modules may include routines, programs, objects, components, logic, data structures, and so on that perform particular tasks or implement particular abstract data types.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method of classifying an object by a trained neural network (NN) trained to classify input data into one of a set of candidate classes, the method comprising:

receiving unknown input data that is not classified;

operating the trained NN on the unknown input data;

receiving, by the trained NN, output indicating that the trained NN cannot classify the unknown input data because a prediction threshold is not met;

responsive to receiving the output and for each class of a set of candidate classes for which the trained NN has been trained:

accessing the trained NN in a state it is in before retraining;

retraining, using backpropagation, the trained NN from its trained state until a prediction can be made, by the retrained NN and because the prediction threshold is met for a current class, for classifying the unknown input data to the current class by an inference procedure;

determining an amount of effort exerted for retraining the trained NN to classify the unknown input data to the current class including counting a number of retraining iterations performed; and selecting a next class of the candidate classes to be the current class after determining the amount of effort;

selecting a class of the candidate classes for which a least amount of effort was exerted in retraining the trained NN by selecting the class for which a fewest number of retraining iterations were performed; and outputting the selected class as the predicted class to which the unknown input data is predicted to be classified.

2. The method of claim 1, wherein retraining the trained NN comprises:

accessing a copy of the trained NN as trained; and iteratively performing backpropagation in the trained NN as copied using the class as a target class until the prediction can be made for classifying the unknown input data to the class.

3. The method of claim 1, wherein:

retraining the trained NN further comprises determining when the prediction can be made for classifying the unknown input data to the class;

the inference procedure is a forward propagation procedure that outputs a predicted class, and it is determined the prediction can be made for classifying the unknown input data to the class when the inference procedure outputs the class as the predicted class.

4. The method of claim 3, wherein the inference procedure further outputs a prediction strength associated with the predicted class that indicates a level of confidence in the predicted class, and wherein determining when the prediction can be made for classifying the unknown input data to the class includes determining whether the output prediction strength satisfies a threshold criterion.

5. The method of claim 4, wherein the predicted class is associated with a neuron of the trained NN after retraining for which a highest value was output by the forward propagation and the prediction strength is a difference between the highest value and a second highest value output for another neuron of the trained NN after retraining by the forward propagation, and the threshold criterion is satisfied when the difference exceeds a predetermined threshold.

6. The method of claim 2, wherein the copy of the trained NN includes a copy of weights associated with the trained NN once trained and before weights are changed by back-propagation during retraining.

7. A computer system for classifying an object by a trained neural network (NN) trained to classify input data into one of a set of candidate classes, the computer system comprising:

a memory configured to store a plurality of programmable instructions; and a processing device in communication with the memory, wherein the processing device, upon execution of the plurality of programmable instructions is configured to:

receive unknown input data that is not classified;

operate the trained NN on the unknown input data;

receive, by the trained NN, output indicating that the trained NN cannot classify the unknown input data because a prediction threshold is not met;

responsive to receiving the output and for each class of a set of candidate classes for which the trained NN has been trained:

access the trained NN in a state it is in before retraining;

retrain, using backpropagation, the trained NN from its trained state until a prediction can be made, by the retrained NN and because the prediction threshold is met for a current class of the candidate classes, for classifying the unknown input data to the current class by an inference procedure;

determine an amount of effort exerted for retraining the trained NN to classify the unknown input data to the current class including counting a number of retraining iterations performed; and select a next class of the candidate classes to be the current class after determining the amount of effort;

select a class of the candidate classes for which a least amount of effort was exerted by selecting the class for which a fewest number of retraining iterations were performed; and output the selected class as the predicted class to which the unknown input data is predicted to be classified.

8. The computer system of claim 7, wherein retraining the trained NN comprises:

accessing a copy of the trained NN as trained; and iteratively performing backpropagation in the trained NN as copied using the class as a target class until the prediction can be made for classifying the unknown input data to the class.

9. The computer system of claim 7, wherein:

retraining the trained NN further comprises determining when the prediction can be made for classifying the unknown input data to the class;

the inference procedure is a forward propagation procedure that outputs a predicted class, and

it is determined the prediction can be made for classifying the unknown input data to the class when the inference procedure outputs the class as the predicted class.

10. The computer system of claim 9, wherein the inference procedure further outputs a prediction strength associated with the predicted class that indicates a level of confidence in the predicted class, and wherein determining when the prediction can be made for classifying the unknown input data to the class includes determining whether the output prediction strength satisfies a threshold criterion.

11. The computer system of claim 10, wherein the predicted class is associated with a neuron of the trained NN after retraining for which a highest value was output by the forward propagation and the prediction strength is a difference between the highest value and a second highest value output for another neuron of the trained NN after retraining by the forward propagation, and the threshold criterion is satisfied when the difference exceeds a predetermined threshold.

12. The computer system of claim 8, wherein the copy of the trained NN includes a copy of weights associated with the trained NN once trained and before weights are changed by backpropagation during retraining.

13. A non-transitory computer readable storage medium and one or more computer programs embedded therein, the computer programs comprising instructions, which when executed by a computer system, cause the computer system to:

receive unknown input data that is not classified;
operate a trained neural network (NN) on the unknown input data;

receive, by the trained NN, output indicating that the trained NN cannot classify the unknown input data because a prediction threshold is not met;

responsive to receiving the output and for each class of a set of candidate classes for which the trained NN has been trained:

access the trained NN in a state it is in before retraining;

retrain, using backpropagation, the trained NN from its trained state until a prediction can be made, by the retrained NN and because the prediction threshold is met for a current class, for classifying the unknown input data to the current class by an inference procedure;

determine an amount of effort exerted for retraining the trained NN to classify the unknown input data to the current class including counting a number of retraining iterations performed; and select a next class of the candidate classes to be the current class after determining the amount of effort;

select a class of the candidate classes for which a least amount of effort was exerted by selecting the class for which a fewest number of retraining iterations were performed; and output the selected class as the predicted class to which the unknown input data is predicted to be classified.

14. The non-transitory computer readable storage medium of claim 13, wherein retraining the network comprises, for each class of the candidate classes:

accessing a copy of the trained NN as trained; and
iteratively performing backpropagation in the trained NN as copied using the class as a target class until the prediction can be made for classifying the unknown input data to the class.

* * * * *